US009284035B2

(12) United States Patent
Victorazzo

(10) Patent No.: US 9,284,035 B2
(45) Date of Patent: *Mar. 15, 2016

(54) COMPOSITE TUBULAR-REINFORCED INTEGRATED STRUCTURAL PANELS WITH MUTUALLY INTERSECTING STIFFENERS AND FABRICATION PROCESSES

(71) Applicant: EMBRAER S.A., São José dos Campos - SP (BR)

(72) Inventor: Danilo Seixas Victorazzo, S. J. Campos (BR)

(73) Assignee: EMBRAER S.A., São José dos Campos - SP (BR)

(*) Notice: Subject to any disclaimer, the term of this patent is extended or adjusted under 35 U.S.C. 154(b) by 0 days.

This patent is subject to a terminal disclaimer.

(21) Appl. No.: 13/730,809

(22) Filed: Dec. 28, 2012

(65) Prior Publication Data

US 2014/0186586 A1    Jul. 3, 2014

(51) Int. Cl.
| | |
|---|---|
| *B32B 37/00* | (2006.01) |
| *B64C 1/12* | (2006.01) |
| *B29D 99/00* | (2010.01) |
| *B29C 70/34* | (2006.01) |
| *B64C 1/06* | (2006.01) |
| *B64C 1/00* | (2006.01) |

(52) U.S. Cl.
CPC .................. *B64C 1/12* (2013.01); *B29C 70/342* (2013.01); *B29D 99/001* (2013.01); *B64C 1/061* (2013.01); *B64C 1/064* (2013.01); *B64C 2001/0072* (2013.01); *Y02T 50/433* (2013.01); *Y10T 428/2457* (2015.01)

(58) Field of Classification Search
CPC .......... B64C 1/068; B64C 1/12; B64C 1/064; B64C 1/069; B29C 66/73751; B29C 65/7808; B29C 70/28; B29C 99/0014; B32B 37/142; Y10T 156/1089; Y10T 156/1093
USPC ........... 156/293, 297, 301.7, 307.7, 212, 213; 244/119, 120
See application file for complete search history.

(56) References Cited

U.S. PATENT DOCUMENTS

| | | | | |
|---|---|---|---|---|
| 2,833,682 | A | * | 5/1958 | De Laszlo ..................... 428/136 |
| 3,995,081 | A | | 11/1976 | Fant et al. |
| 4,223,053 | A | | 9/1980 | Brogan |
| 5,242,523 | A | * | 9/1993 | Willden et al. ............... 156/285 |

(Continued)

FOREIGN PATENT DOCUMENTS

| | | |
|---|---|---|
| EP | 1 800 842 | 6/2007 |
| GB | 830072 A * | 3/1960 |

*Primary Examiner* — John Goff
(74) *Attorney, Agent, or Firm* — Nixon & Vanderhye P.C.

(57) ABSTRACT

A process for fabricating an integrated panel structures and the structures thereby fabricated are provided with first and second stiffeners positioned on a base skin so that the stiffeners intersect at respective intersecting regions. First and second fiber-reinforced resin-composite overlapping layers are provided on the first and second stiffeners so that at least lateral regions thereof are laminated to a corresponding region of the base skin. The base skin and the overlapping layers may be assembled with the first and second stiffeners to form a panel preform which may then be subjected to curing conditions so as to co-cure all previously uncured components and thereby form an integrated composite panel structure with mutually intersecting first and second stiffeners.

6 Claims, 9 Drawing Sheets

(56) References Cited

U.S. PATENT DOCUMENTS

| | | |
|---|---|---|
| 6,110,567 A | 8/2000 | Bird |
| 6,510,961 B1 * | 1/2003 | Head et al. .................... 220/645 |
| 6,702,911 B2 * | 3/2004 | Toi ........................ B29C 70/443 156/285 |
| 6,743,504 B1 * | 6/2004 | Allen et al. .................... 428/362 |
| 7,527,222 B2 | 5/2009 | Biornstad et al. |
| 8,042,315 B2 | 10/2011 | Ashton et al. |
| 8,079,549 B2 | 12/2011 | Gouvea |
| 2008/0302912 A1 * | 12/2008 | Yip et al. ...................... 244/119 |
| 2009/0071098 A1 | 3/2009 | Ashton et al. |
| 2011/0027526 A1 * | 2/2011 | McCarville et al. .......... 428/116 |

* cited by examiner

COMPOSITE TUBULAR-REINFORCED INTEGRATED STRUCTURAL PANELS WITH MUTUALLY INTERSECTING STIFFENERS AND FABRICATION PROCESSES

CROSS-REFERENCE TO RELATED APPLICATION

The present application may be deemed to be related to commonly owned U.S. application Ser. No. 13/730,803 filed on Dec. 28, 2012, the entire content of which is expressly incorporated hereinto by reference.

FIELD

The embodiments disclosed herein relate to structural panels, especially aircraft structural panels, comprised of elongated mutually intersecting tubular stiffeners, such as tubular stringers and frames, and their associated manufacturing methods.

BACKGROUND

Most conventional reinforced composite panel applications are dependent on mechanically fastening at least part of the stiffening elements to the underlying skin. These elements, which in aircraft fuselage applications are known as longitudinal stringers and circumferential frames, are cured in separate processes and later bolted/fastened to a skin shell and in some cases, at least partially to each other. Such concepts, often referred as "black aluminum" due to the similarities with fastened metallic parts, suffer from the low strength resistance of the composites to stress cracks, such as those that may be caused by the necessary drilled holes during fabrication. This characteristic often results in significant weight penalties and the increased costs of assembly operations. Also, the usually high part count associated to these non-integrated concepts increases costs for inventory control, storage, inspection, transportation, and servicing. Although the ideal structural panel may be envisioned to have a part count of one, such integration has been historically avoided due to designs that become overly complex, heavy, or difficult to manufacture.

Many proposals have been made in the art to integrate panels by co-curing, bonding or co-bonding stringers to skins but fewer examples exist on the total integration of these skins to intersecting reinforcements, such as stringers and frames. Such integration usually requires complex tooling designs to allow its disassembly or secondary bonding processes, e.g., bondings that occur after the parts are cured. Such post-cure bonding processes are difficult to certify in primary aircraft composite parts since reliable quality inspection techniques are still lacking, proof testing of each produced part (usually economically unviable) is required and/or over-conservative debonding scenario assumptions must be factored into the component design (thereby also translating into component weight penalties due to the requirement of more robust and/or redundant structural components).

Another challenge to providing a unified one-piece structural panel with intersecting components (e.g., intersecting stringers and frames) relates to the panel geometry. In this regard, most prior attempts to create panels that integrate intersecting reinforcing members can be classified as "grid-panels" as evidenced by U.S. Pat. Nos. 6,110,567, 8,042,315 and 8,079,549[1]. According to these prior proposals, the intersecting members are laminated at the same level (height) above the skin thereby creating laminating conflicts at their intersections. There also are several disadvantages associated with these prior proposals, including the need for ply cuts, fabric shear while draping the plies, interrupted load paths, labor intensive lamination, and the like.

[1] The entire contents of each of these publications, as well as the entire contents of any other publications cited below, are expressly incorporated hereinto by reference.

Closed section stiffeners are especially desirable due to their higher torsional stiffness when compared to open sections. Hat (or omega) stringer concepts, although forming a closed section with the underlying skin in a pristine condition, when delaminated or debonded will behave like open sections—that is, they are unable to stabilize the nearby skins and are unstable themselves since they lack base shell support. In this regard, one proposal (e.g., U.S. Pat. No. 3,995,081) is especially concerned with the potential delaminations of hat stiffeners and adds inner plies to create two "T" flanges at the stiffener base. Other proposals (e.g., U.S. Pat. No. 7,527,222) exist which mechanically fasten the frames over hat stiffener base flanges in an attempt to eliminate such a delamination scenario. Another stringer-only proposal that shares a similar problem (e.g., EP 1800842B1) adopts an inward flanged variation of the hat stiffener.

The use of tubular reinforcements instead of flanged stiffeners (such as hat, omega or inwardly flanged cross-sections) is also known in the art, e.g., from U.S. Pat. No. 4,223,053. According to this prior proposal, a truss-core panel is provided which includes the use of preformed and cured tubes and two separated cure cycles (the first dedicated to produce the tube and the second to crate the entire integrated panel structure. Face sheets may be bonded to the tubes at the same time the face sheets are cured, with a face sheet being overlapped with a tube.

The '053 patent uses the features noted above on a truss-core panel concept. Such a part, however, is difficult to inspect since it creates inaccessible areas; is dependent on the individual manufacturing of a large number of tubes; is difficult to provide interfaces to attach other structures; and significantly reduces the internal structural volume by overlapping tubes. Also, a truss-core panel is structurally not equivalent to a stiffener. Normally, in those composite panels using cores, the cores are used to increase the bending stiffness of the panel by displacing its face sheets, while in composite panels using reinforcements (e.g., stringers and frames), the reinforcements are usually themselves responsible for adding the same bending stiffness.

It would therefore be especially desirable if improvements were provided for integrated composite structural panels which comprise mutually intersecting elongate stiffeners (e.g., stringers and frames). It is towards providing such improvements that the embodiments of the invention disclosed herein are directed.

SUMMARY

The disclosed embodiments herein are directed toward integrated composite structural panels which comprise mutually intersecting first and second elongate stiffeners (e.g., stringers and frames) and to process for fabricating the same. According to some embodiments, therefore, the integrated panel structures include first and second stiffeners positioned on a base skin so that the stiffeners intersect at respective intersecting regions. First and second fiber-reinforced resin-composite overlapping layers are provided on the first and second stiffeners so that at least lateral regions thereof are laminated to a corresponding region of the base skin. The base skin and the overlapping layers may be assembled with the first and second stiffeners to form a panel preform which may then be subjected to curing conditions so as to co-cure all previously uncured components and thereby form an integrated composite panel structure with mutually intersecting first and second stiffeners.

According to some preferred embodiments, composite materials, such as carbon, and/or glass fiber-reinforced thermosetting and thermoplastic resins are employed to form the components of the structural panels. Other hybrid constructions are also contemplated which incorporate metallic reinforcement structures (e.g., stringers and/or frames) such as aluminum, titanium, and the like on a fiber-reinforced resin composite skin.

According to some embodiments, the first and second overlapping layers comprise continuous plies which overlap exterior surfaces of the first and second stiffeners (not including the exterior surfaces of the base of the stiffeners), respectively, and regions of the base skin between the first and second stiffeners. In such embodiments, therefore, the first and second overlapping layers may be cross-plied with respect to one another in the regions of the base skin defined between the first and second stiffeners.

Alternatively (or additionally) the first and second overlapping layers comprise first and second overlapping straps having a sufficient widthwise dimension so as to be laminated with respect to a corresponding region of the base skin laterally of the first and second stiffeners, respectively.

Some embodiments include the laying up of uncured fiber-reinforced resin-composite pad strips on the base sheet, such that the first and second stiffeners may be positioned on the pad strips. A plurality of uncured fiber-reinforced resin-composite sheets may be laid-up onto a surface of a forming tool to form the base skin. An uncured filler material may be placed in spaces between the first and second overlapping layers and the first and second stiffeners. In such a manner, the thus assembled preform may be subjected to curing conditions so as to simultaneously cure (co-cure) all previously uncured components.

The first and/or second stiffeners may comprise rigid tubular pre-cured composite stiffeners (e.g., as disclosed in the above-identified copending U.S. application Ser. No. 13/730,803 filed concurrently herewith or rigid tubular metal stiffeners. In some embodiments the first and/or second stiffeners may have a trapezoidal cross-section. The height of the first stiffeners may be less than the height of the second stiffeners. An opening may be formed in the second stiffeners which are sized and configured to allow the first stiffeners to pass therethrough at the intersecting regions.

These and other aspects and advantages of the various embodiments according to the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION

Figure 1:
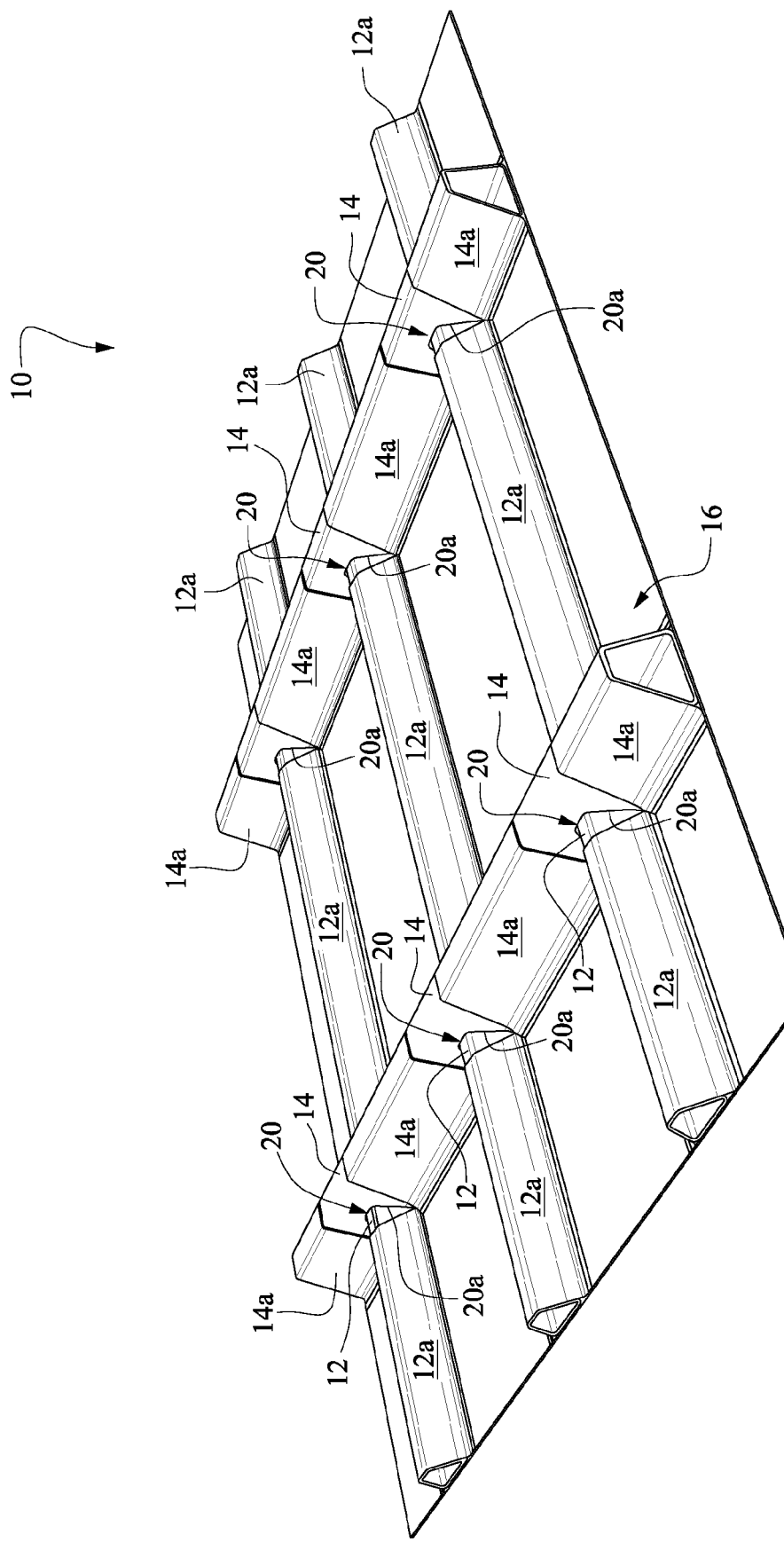
FIG. 1 is a perspective view of an integrated panel structure comprising a base skin and elongated first and second stiffeners integrated with one another and with the base skin by first and second overlapping layers, respectively.

The uncured plies that may be employed according to the embodiments disclosed herein may be comprised of uncured (or partially cured) resin pre-impregnated carbon, glass or aramid fibers (i.e., so called "prepregs" in art parlance). Plies of prepreg sheets may be laid down manually or by automated laying processes such as Automated Tape Laying and Automated Fiber Placement.

According to some embodiments, uncured plies of prepreg sheets are laminated in the desired fiber orientation on a tooling and then vacuum bagged along with the pre-cured or metallic reinforcements (e.g., stringers and frames). These reinforcements, if left without internal toolings, may have their ends covered by ventilated caps to avoid vacuum bag collapse at latter stages of the process. If necessary, sealing inserts may be added to avoid uncontained resin flow at the stringer/frame intersection regions. After vacuum bagging, the composite with the tooling is placed inside an oven or autoclave so that heat and pressure can be applied for curing and consolidation of the panel. After cooling, the vacuum bag is removed and the integrated structural panel is removed.

Alternatively, the uncured plies may be understood as dry performs that are resin infused prior to the panel cure. RTM (Resin Transfer Molding) and vaRTM (Vacuum Assisted Resin Transfer Molding) are two examples of infusion processes that may adopt the methods outlined above.

In the RTM process, dry perform plies are placed into a first tooling half along with the pre-cured or metallic reinforcements (e.g., stringers and frames). Sealing inserts may be added to avoid uncontained resin flow at the stringer/frame intersection regions. A matching tooling half is mated to the first half and the two are clamped together. Thereafter, a pressurized mixture of thermoset resin, a catalyst, filler or the like, is pumped into the matching tooling using dispensing equipment having single or multiple dispensing ports. After curing and cooling, the panel is then removed from the tooling.

By the vaRTM process, dry perform plies are placed along with the pre-cured or metallic reinforcements (stringers and frames) in a one-sided tooling and a cover, either rigid or flexible, is placed over the top to form a vacuum-tight seal. Sealing inserts may be added before applying the vacuum-tight seal to avoid uncontained resin flow at the stringer/frame intersection regions. A vacuum procedure is used to draw the resin into the structure through various types of ports. Thereafter, the composite with the tooling is usually positioned inside an oven or the tooling is heated to cure the part. After cooling, the cover is removed and the panel is taken out.

Prior to laminating the overlapping uncured plies over the tubular stiffeners, fillers (also known as "noodles") may be applied at the tubular base corners. Such fillers provide smooth corner interface between stiffeners and the uncured plies (a desirable feature from a manufacturing and structural stand point).

The tubular bases may also be reinforced by pad-up plies. These pad-up plies may restore an eventual thickness reduction at the bottom skin plies (i.e., since the top skin plies may be used to overlap the tubes). Pad-up plies also provide a stable base for the stiffeners in a post-buckled skin scenario caused by compression and/or shear loads.

The structural panels use closed-section tubes as intersecting stiffener elements and these tubes are enveloped by composite plies to be later co-cured. This enveloping is achieved in a way that prevents the draping challenges discussed previously, that is the tube-covering plies are especially tailored to avoid the intersection regions of the stiffeners. One technique according to some embodiments disclosed herein to achieve this is by adding cut-outs at these intersections to the plies that cover stringers and frames simultaneously. Another technique according to other embodiments disclosed herein is to laminate ply straps that cover only stringers and ply straps that cover only frames. These ply straps may have lateral regions that extend over the unstiffened skin regions thereby themselves forming a part of the skin, or may extend only the sufficient length to compose a base with the skin to keep the stiffeners in place after cure. Combinations of these different plies may be used in a same panel. Also, some or all of these features may be present in each ply. The stiffening elements (stringers and frames) that are covered by these plies are preserved without requiring ply interruptions and overlap joints common to other concepts that attempt such intersection.

Features that are common practice in this art with respect to composite laminated parts are equally possible in the fabrication techniques according to the present invention, including plies containing interruptions, drop-offs between plies, butt-joints, overlapping joints, local reinforcement patches, and the like.

According to one embodiment, no internal pressurization is applied on the tubes. Instead, the tube hollow sections are exposed to vacuum, with caps on their ends preventing vacuum bag from collapsing inwardly. This requires the cross-sections of the stiffeners to be structurally stable under the panel curing temperatures and pressures. Examples from such structures can be found in most pre-cured fiber/resin material systems (thermoplastic or thermosetting resins) obtained from a range of manufacturing processes such as pultrusion, RTM, vaRTM, RFI, hand-lay-up, fiber-placement, ATL, and the like. Metallic parts, meeting the same requirements, can also be used. The use of structurally stable reinforcements removes the requirement of toolings or pressurized bladders inside these reinforcements to shape and compact them during the panel cure process. As a consequence, this manufacturing option removes all stiffener tooling disassembly operations from the fabrication process, along with their usual problems (e.g., leaking bladders which cause widespread porosity in the resulting composite laminate; solid rubber toolings may produce stiffeners with distorted cross-sections or exert an uneven pressure on the uncured plies; solid metal or composite toolings are usually heavy to handle in large parts and may not have sufficient flexibility to be removed from parts with curvature; dissolvable toolings may be expensive to make and difficult to remove from large parts).

When necessary, such conventional internal tooling solutions (e.g., a certain tooling inside the stiffener) may be used in stiffener cross-sections that are structurally unstable under their panel curing conditions. Although structurally unstable, these stringers, being already cured or metallic, will not need to be compacted or properly bagged to avoid porosity or incorrect fiber/volume ratios at difficult areas such as those at intersections.

By separating the stringer and frame manufacturing from the actual panel manufacturing, multiple suppliers with different technology expertise can be used. That is, the final integrated panel manufacturer does not need to have the manufacturing expertise for all the parts being integrated.

Having separated stiffener manufacturing also allows an increased tooling commonality. A single tooling can serve to manufacture all geometrically compatible stiffeners in the same panel. Conventional processes that use uncured stiffeners needs one tooling for each stringer or frame, regardless of part geometric commonality.

Accompanying FIG. 1 depicts an integrated structural panel 10 according to an embodiment of the present invention. As shown, the panel 10 is comprised generally of intersecting first and second elongated tubular stiffeners (e.g., stringers and frames associated with an aircraft structural panel) 12, 14, respectively, integrated onto a composite skin 16. As shown, the first and second stiffeners 12, 14 each have a generally trapezoidal cross-sectional geometry, with the first stiffeners 12 (stringers) being at a height that is less than the height of the second stiffeners 14 (frames). For example, the first stiffeners 12 may have a height that is between about 20% to about 80% (e.g., about 50%) the height of the second stiffeners 14.

The first and second stiffeners 12, 14 intersect at intersecting regions 20. More specifically, in the embodiment depicted in FIG. 1, each of the second stiffeners 14 is formed with an opening 20a to accommodate the cross-sectional geometry of a respective one of the first stiffeners 12. Thus, the first stiffeners 12 pass through the openings 20a at the intersecting regions 20 with the second stiffeners 14.

In the embodiment shown in FIG. 1, the first and second stiffeners 12, 14 are placed onto the base sheet 16. Overlapping plies 12a, 14a are laminated to the first and second stiffeners 12, 14, respectively, and also to the base sheet 16. In this regard, the overlapping plies 12a, 14a may be full length plies that are laminated to the total exposed surface of base sheet 16. Alternatively (or additionally) the overlapping plies 12a, 14a are in the form of individual straps which include lateral flange regions that are laminated to the base sheet 16. Additional plies may thus be overlaid and laminated to the base sheet 16 in those regions defined between the intersecting first and second stiffeners 12, 14, respectively.

Figure 2:
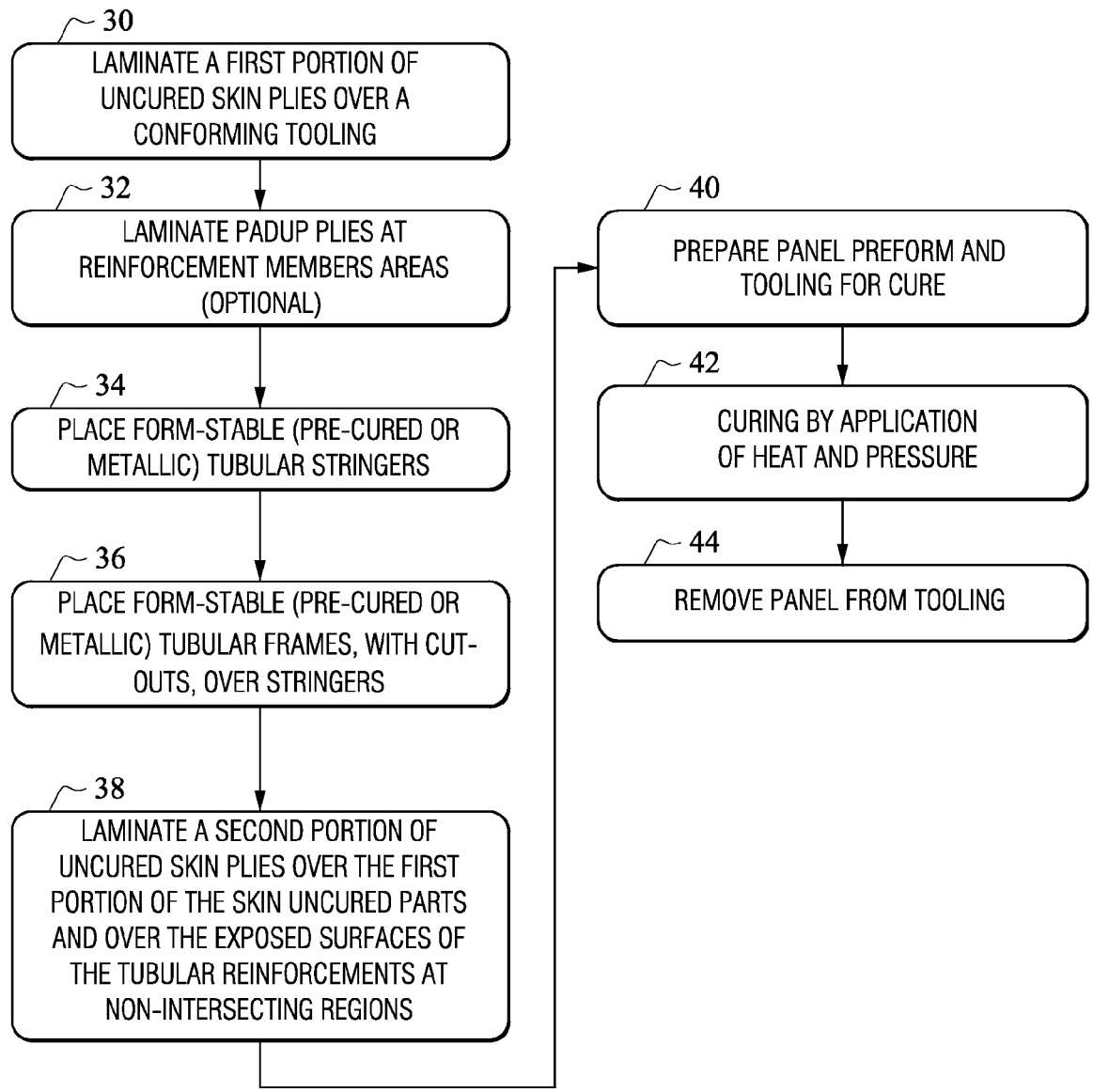
FIG. 2 is a process flowchart for fabricating the integrated structural panel shown in FIG. 1.
Figure 3A:
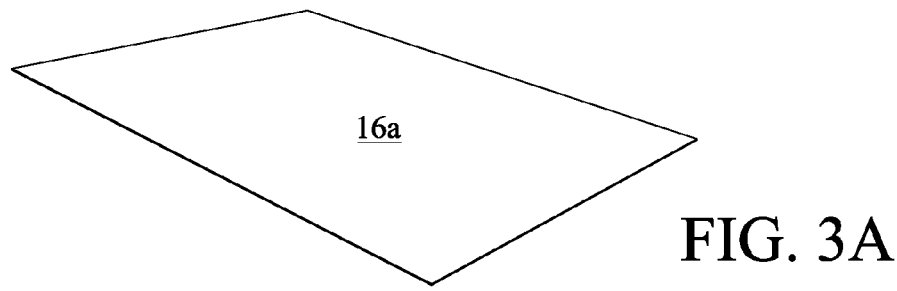
FIGS. 3A-3E are sequential perspective views of the panel preform assembly according to one embodiment of a fabrication process.
Figure 3B:
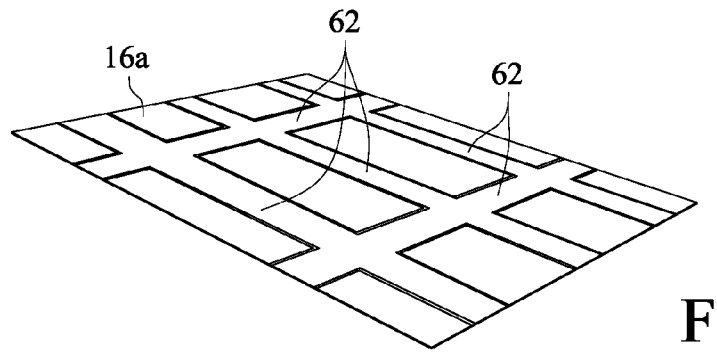
Figure 3C:
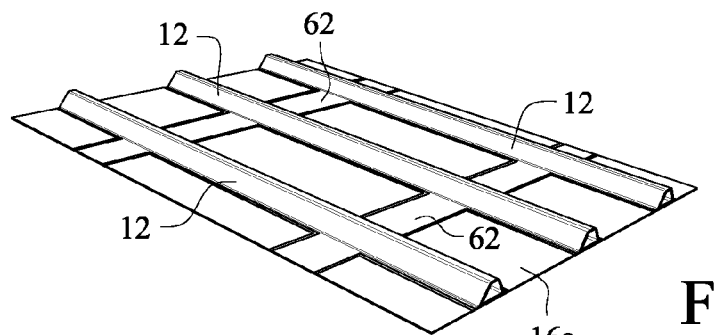
Figure 3D:
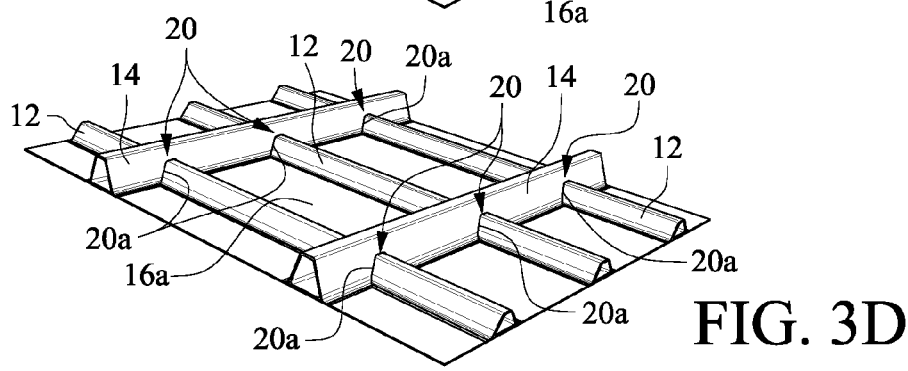
Figure 3E:
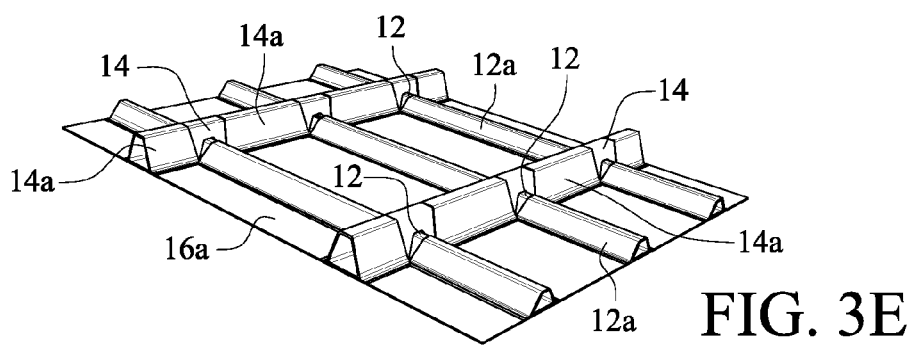

Accompanying FIG. 2 shows a representative flow chart for fabricating the integrated structural panel depicted in FIG. 1 and may be referenced to FIGS. 3A-3E and FIG. 6. As shown, in step 30 (FIG. 3A) a first portion 16a of uncured prepreg skin plies may be applied over a suitable tooling (e.g., a rigid flat male forming tool 60 shown in FIG. 4). Thereafter in step 32 (FIG. 3B), a number of padup plies 62 may optionally be laid onto the first portion 16a of skin plies in the regions to later be occupied by the first and second tubular stiffeners 12, 14, respectively. At this time, optional sealing base straps or film (not shown) may be applied onto the first portion 16a of skin plies in those regions in registry with the intersecting regions 20 between the first and second stiffeners 12, 14, respectively. An adhesive bonding layer 64 (see FIG. 4) may also be applied at least partially (or entirely) around an external surface of the first and/or second stiffeners 12, 14, respectively.

The elongate first tubular stiffeners 12 may then be positioned in step 34 (FIG. 3C) onto the first portion 16a of the skin plies (or onto the corresponding padup plies 62 if used), followed by step 36 (FIG. 3D) whereby the second elongate tubular stiffeners 14 with cutout openings 20a therein are positioned onto the first portion 16a of skin plies (or onto the corresponding padup plies 62 if used). In this manner, the first stiffeners 12 extend through the openings 20a to thereby establish the intersecting regions 20 between the first and second stiffeners 12, 14, respectively.

At this time optional steps of placing filler material (noodles) 65 (see FIG. 4) at the bases of the first and/or second stiffeners 12, 14, respectively, and/or placing sealing inserts (not shown) placed at filler ends to avoid resin ingression at the intersecting regions 20 may be accomplished.

Thereafter, in step 38 (FIG. 3E) a second portion 16b of uncured prepreg skin plies in the form of overlapping plies 12a, 14a are laminated to the exposed surface of the first portion 16a of skin plies and in overlapping manner with respect to the exposed external surfaces of the first and second elongate stiffeners 12, 14, respectively.

In step 40, the panel preform as assembled in the previous steps may be prepared for curing. Such preparation may include, for example, placing sealing inserts (not shown) placed at second portion 16b of skin plies ends at the intersecting regions 20 to avoid resin ingression at the intersecting regions 20. It may also include the placement of ventilated caps at the ends of the tubular first and second stiffeners 12, 14, respectively, to avoid vacuum bag blow at unsupported cavities. It may also include the placement of the assembly in a vacuum bag 66 (see FIG. 4). The thus prepared preform assembly may then be placed in step 42 in an oven or autoclave so that the resin of the prepreg material cures (hardens) by the application of heat and pressure. Once cured, the cured panel 10 may be removed physically from any associated tooling in step 44.

Figure 5:
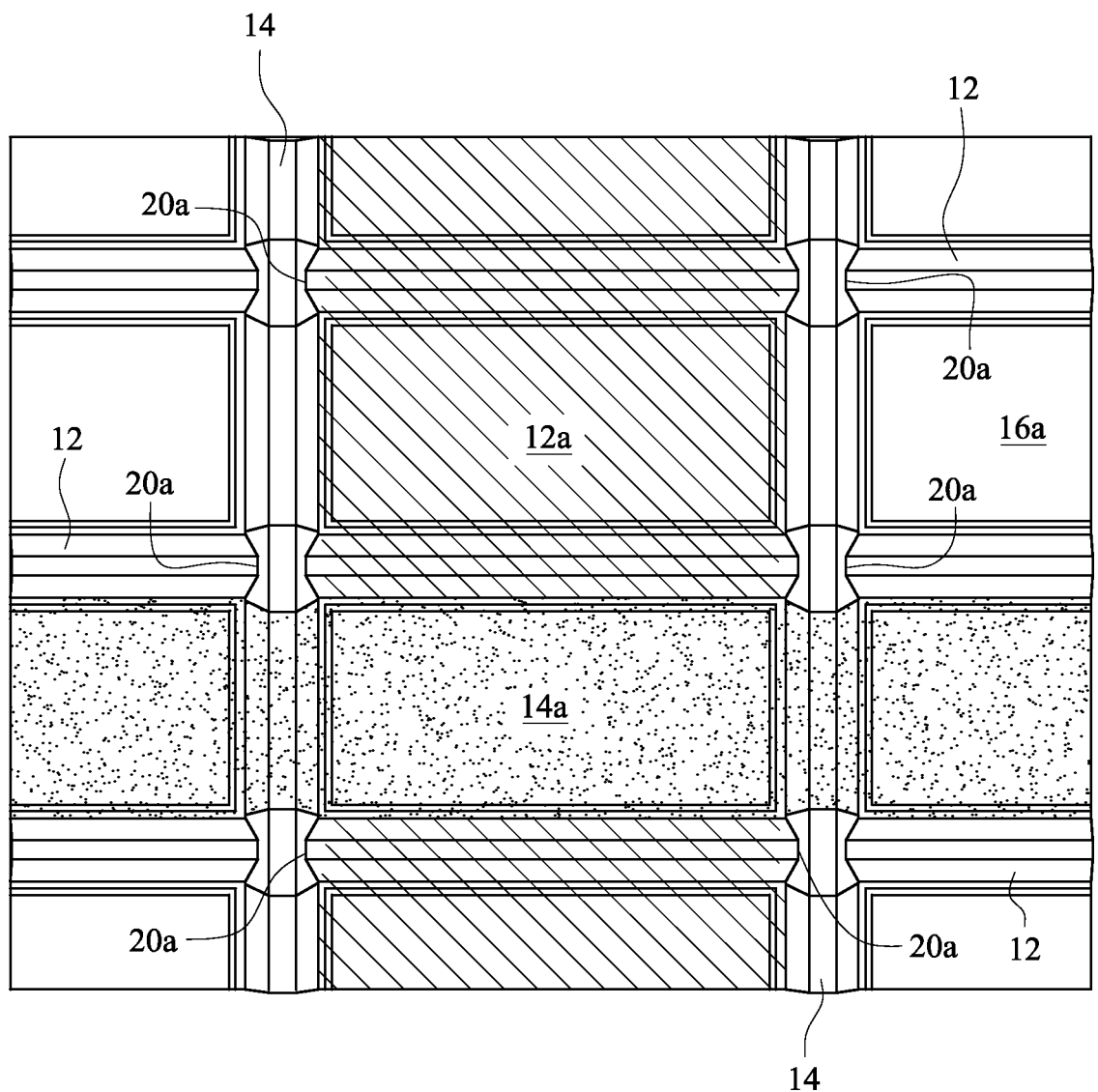
FIG. 5 is a top plan view of an integrated panel structure according to an embodiment of the invention.
Figure 6:
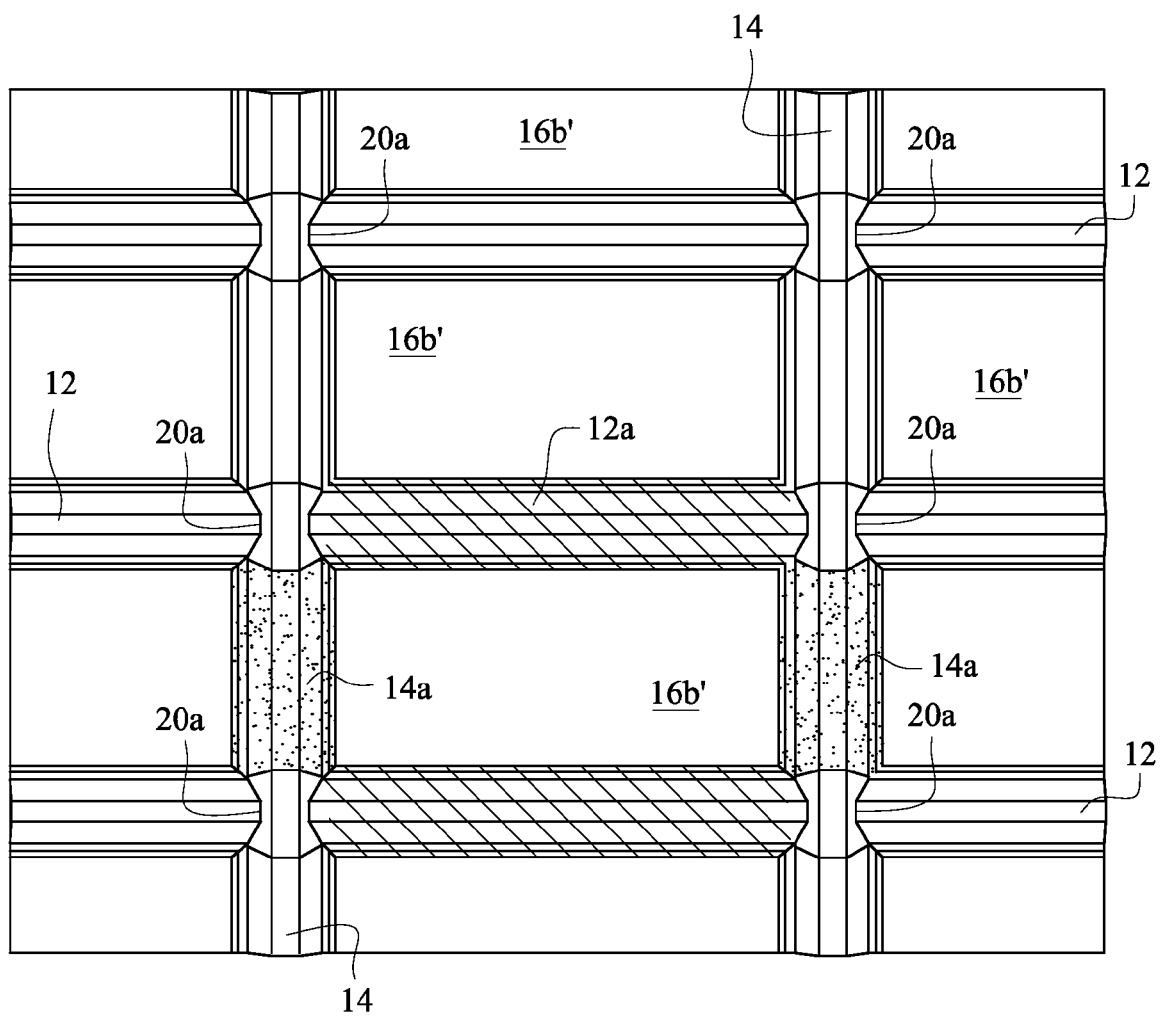
FIG. 6 is a top plan view of an integrated panel structure according to another embodiment of the invention.

The overlapping plies 12a, 14a may be a continuous sheet as shown in which case the plies 12a, 14a are cross-plied with one another in the regions of the base skin 16 defined between the mutually intersecting stiffeners 12 and 14. Alternatively (or additionally) the overlapping plies 12a, 14a may be separate individual overlapping straps (e.g., such as the strap 12a' shown in FIG. 4) having a sufficient widthwise dimension so as to provide lateral edge regions 12a'-1 which are capable of being laminated to an underlying region of the first portion 16a of skin plies and/or the padup plies 62 (if present). For example, FIG. 5 shows the presence of a continuous overlapping ply 12a (depicted by cross-hatched lines for greater visibility) for the first stiffeners 12 and continuous overlapping ply 14a (depicted by stippling for greater visibility) for the second stiffeners 14 cross-plied with the overlapping ply 12a. On the other hand, FIG. 6 shows separate overlapping straps 12a' (depicted by cross-hatched lines for greater visibility) for the first stiffeners 12 and overlapping straps 14a (depicted by stippling for greater visibility) for the second stiffeners 14. If the embodiment of FIG. 6 is employed, then those skin regions defined between the mutually intersecting first and second stiffeners 12, 14, respectively, may include additional prepreg plies 16b'.

Figure 7:
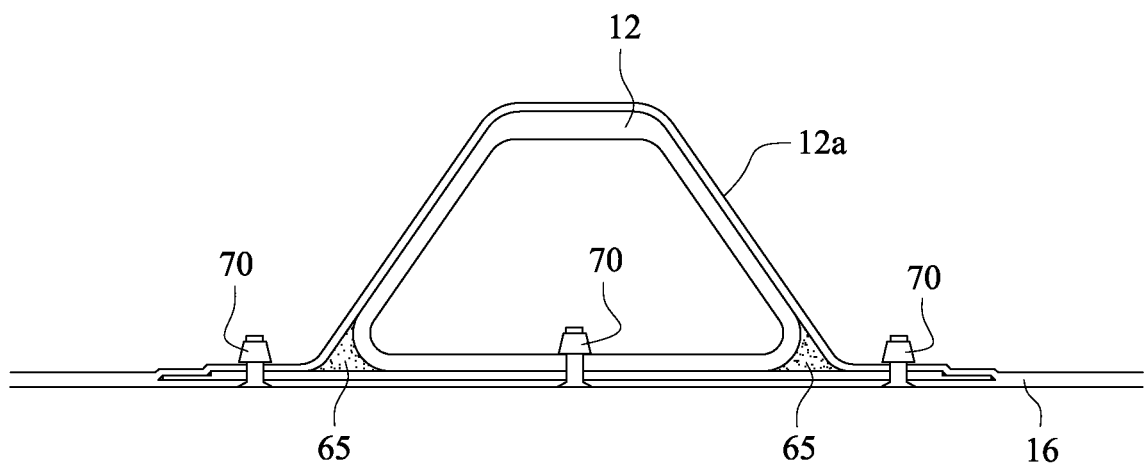
FIG. 7 is a partial end view of an exemplary stringer forming an integrated panel structure according to another embodiment.

Additional structural connection may be made between the first and/or second stiffeners 12, 14, respectively, and the base skin 16 and/or between the overlapping plies 12a, 14a (and/or overlapping straps 12a', 14a') and the base skin 16 using suitable rivets, bolts or the like as depicted by reference numerals 70 in FIG. 7.

Figure 4:
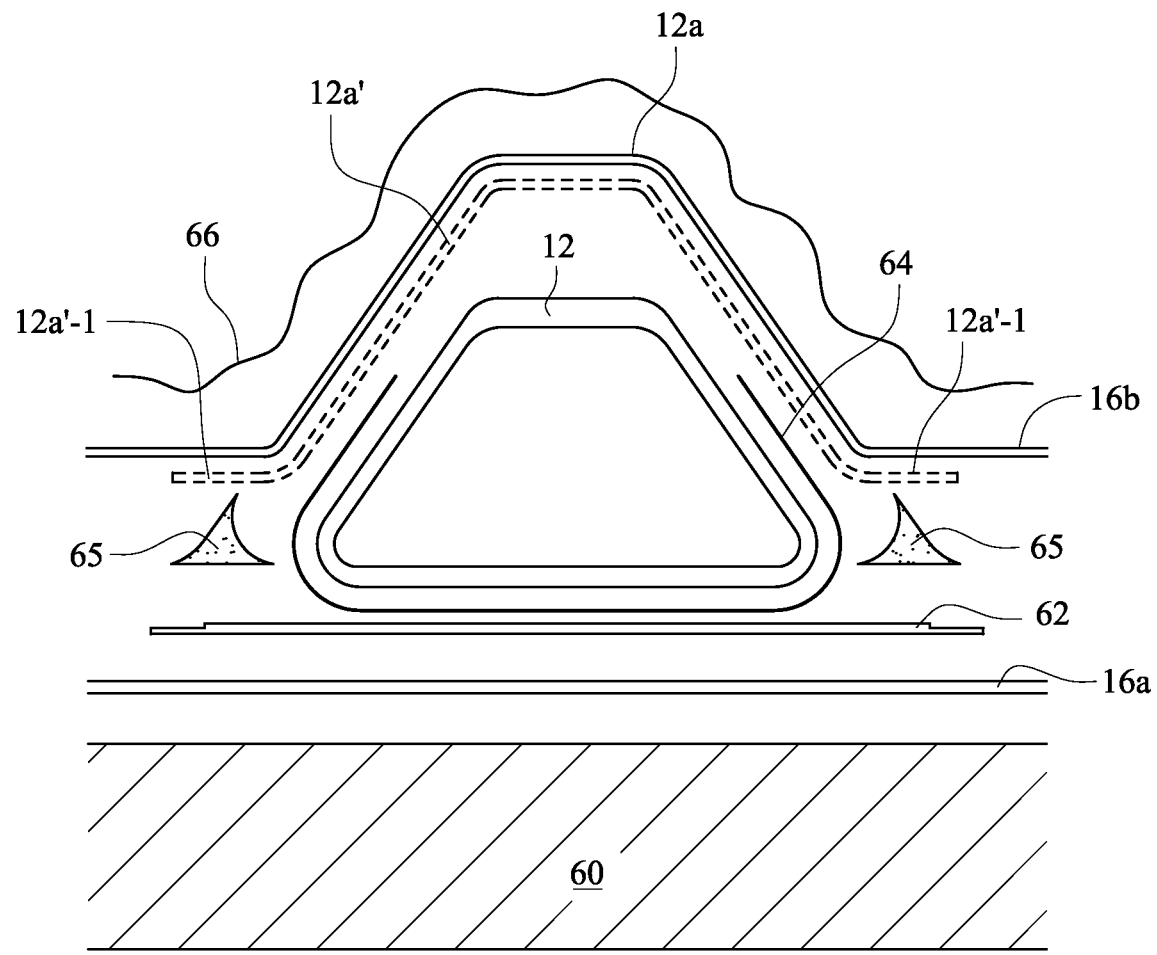
FIG. 4 is an exploded view of a structural panel preform assembly suitable for curing into an integrated panel structure according to the fabrication process according to FIGS. 3A-3E.

The embodiment described above is particularly well suited for use with a male tooling 60 as shown in FIG. 4 as a flat tooling. However, as shown in FIGS. 8A-8E and FIG. 9, an embodiment is also contemplated which uses female tooling 80 which includes intersecting cavities 82, 84 for accepting therein the cross-sectional geometries of the first and second stiffeners 12, 14, respectively.

Figure 8A:
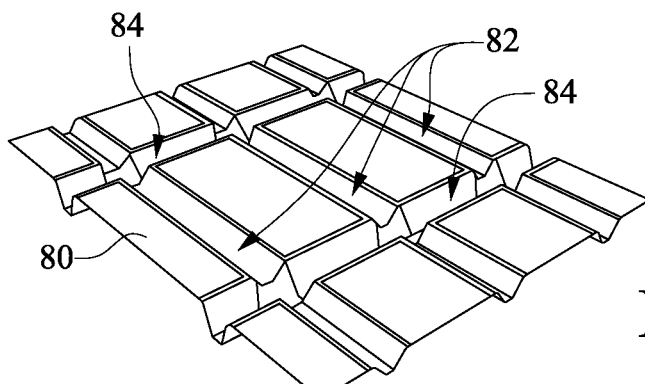
FIGS. 8A-8D are sequential perspective views of the panel preform assembly according to another embodiment of a fabrication process.
Figure 8B:
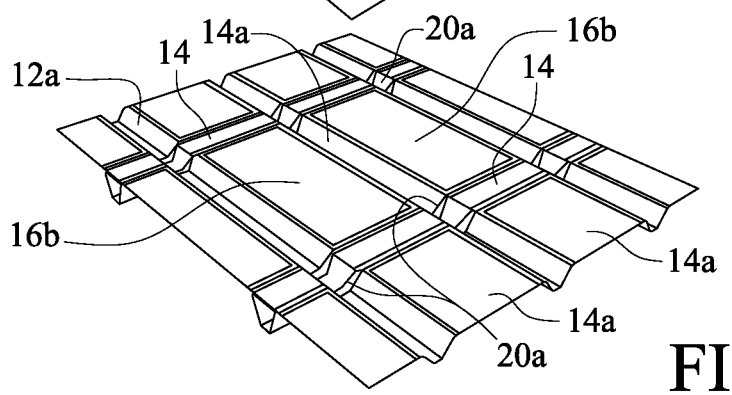
Figure 8C:
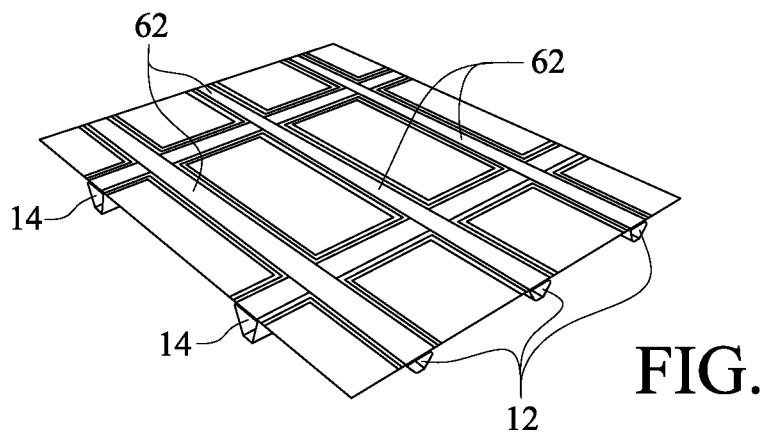
Figure 8D:
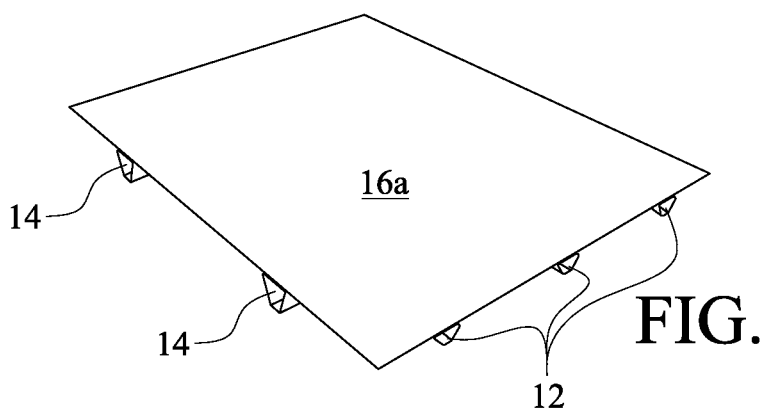
Figure 9:
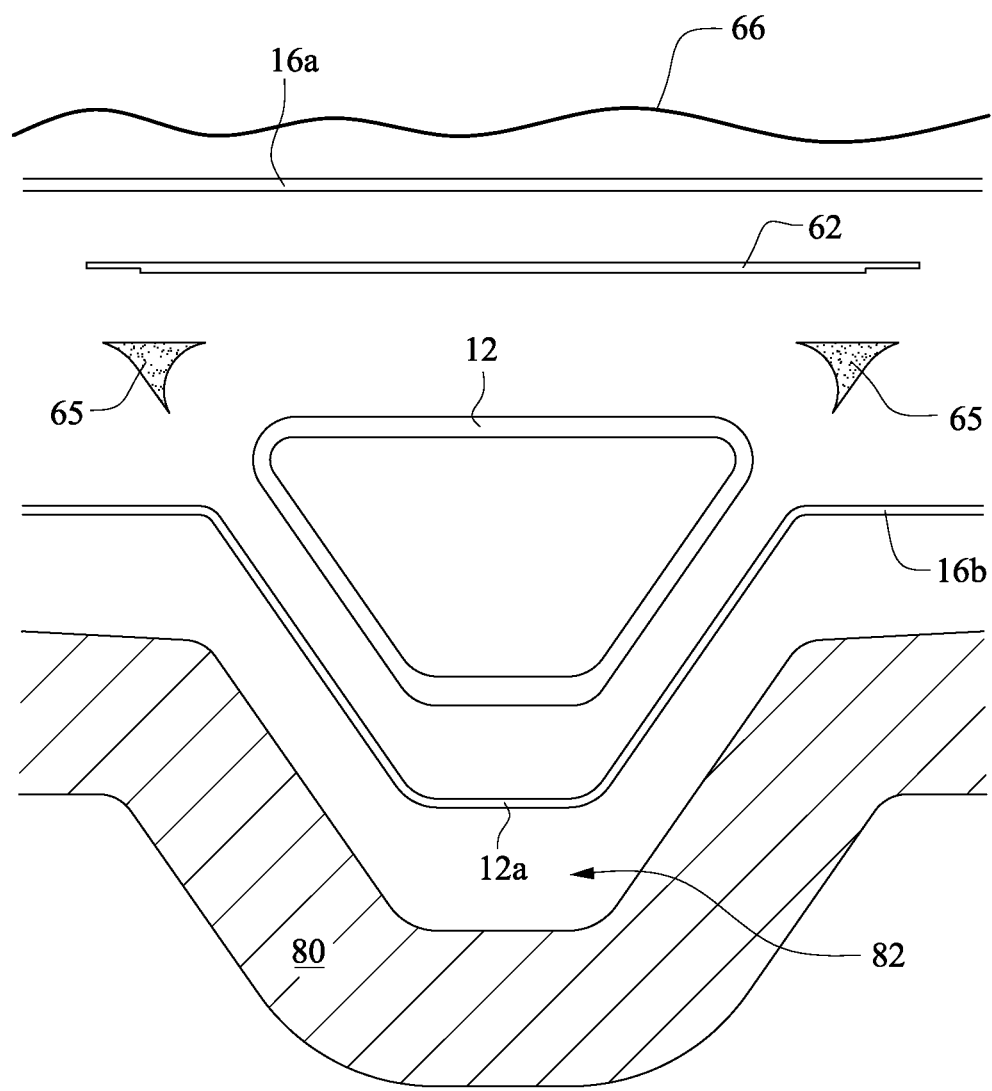
FIG. 9 is an exploded view of a structural panel preform assembly suitable for curing into an integrated panel structure according to the fabrication process shown in FIGS. 8A-8D.

According to this embodiment, the lay-up procedure is generally opposite to that described previously. That is, the uncured prepreg overlapping plies 12a, 14a (and/or overlapping straps 12a', 14a') may be positioned within the cavities 82, 84, respectively, so as to conform to the geometries of the cavity surfaces (FIG. 8A). In addition, some additional uncured prepreg plies 16b may be applied onto the tooling surfaces in the areas defined by the intersecting cavities 82, 84 (FIG. 8B). Then, the first and second stiffeners 12, 14, respectively, are placed within the cavities 82, 84, respectively (FIG. 8C). If required, padup plies 64 may then be applied over the bases of the stiffeners 12, 14 (FIG. 8C). At this time optional steps of placing filler material (noodles) 65 (see FIG. 9) at the bases of the first and/or second stiffeners 12, 14, respectively, and/or placing sealing inserts at filler ends to avoid resin ingression at the intersecting regions 20, may be accomplished. Thereafter, additional plies 16a may be laminated onto the assembly to form the bottom portion of the panel (FIG. 8D).

The thus assembled panel preform may then be prepared for curing and then cured by application of heat and pressure. The thus cured panel 10 may then be removed from the tooling 80.

Various optional techniques may be practiced when fabricating the panel 10 as described previously. For example, the first and/or second tubular stiffeners 12, 14, may be provided with an adhesive bonding film over its external surface prior to being assembled onto the preform. Additional padup plies may be laminated over the exposed surfaces and/or ends of the tubular first and/or second stiffeners 12, 14, covering an area of the ply straps near their exposed surfaces. Sealing base straps or (plastic) films may be placed at the intersecting regions 20 between the first and second stiffeners 12, 14, respectively. Sealing inserts may be placed at filler ends to avoid uncontained resin flow at the intersecting regions 20 and/or may be placed at the ends of the ply straps. Additional mechanical reinforcement (e.g., similar to that shown in FIG. 7 may be effected between the first and second stiffeners and/or between the stiffeners and the base skin.

As noted previously, a vacuum curing system may be employed in which case the panel preform may be enveloped in a suitable vacuum bag. Alternatively, the hollows of the tubular first and second stiffeners 12, 14 may be pressurized.

Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. A process for fabricating an integrated panel structure having mutually intersecting first and second tubular stiffeners comprising:
   (a) forming a panel preform assembly by:
      (i) providing a plurality of rigid first and second tubular stiffeners, the first tubular stiffeners having a height dimension less than a height dimension of the second tubular stiffener and the second tubular stiffeners having longitudinally spaced apart openings therethrough sized so as to accept respective portions of the first tubular stiffeners therein, (ii) positioning respective parallel adjacent pairs of the first and second tubular stiffeners onto an uncured base skin by:

(iia) orienting the adjacent parallel pairs of first tubular stiffeners in a first direction and the adjacent parallel pairs of second tubular stiffeners in a second direction which is substantially mutually orthogonal to the first direction, (iib) aligning the respective parallel adjacent pairs of the first and second tubular stiffeners such that each of the first tubular stiffeners is positioned so that the respective portions of the first tubular stiffeners are received within respective openings of the second tubular stiffeners thereby causing the first and second tubular stiffeners to establish respective intersection regions defined by the openings of the second tubular stiffeners and the respective regions of the first tubular stiffeners received therein and to thereby establish respective interior regions bounded by the adjacent parallel pairs of the first and second tubular stiffeners, (iii) applying a first uncured fiber-reinforced resin-composite overlapping layer comprising a continuous ply onto the first tubular stiffeners so that portions of the first uncured fiber-reinforced resin-composite layer overlap exterior surfaces of each of the first tubular stiffeners with opposed lateral regions of each portion being positioned within respective interior regions bounded by the adjacent parallel pairs of the first and second tubular stiffeners; and (iv) applying a second uncured fiber-reinforced resin-composite layer comprising a continuous ply onto the second tubular stiffeners so that portions of the second uncured fiber-reinforced resin-composite layer overlap exterior surfaces of each of the second tubular stiffeners with opposed lateral regions of each portion being positioned within the respective interior regions on the base skin such that the first and second overlapping layers are cross-plied with respect to one another in the respective interior regions on the base skin bounded by the adjacent parallel pairs of the first and second tubular stiffeners; wherein steps (a)(iii) and (a)(iv) are practiced such that the respective intersection regions defined by the openings of the second tubular stiffeners and the respective regions of the first tubular stiffeners received therein are uncovered by the first and second overlapping layers; and (b) curing the fiber-reinforced resin-composite base skin and the first and second overlapping layers to thereby form an integrated composite panel structure with mutually intersecting first and second tubular stiffeners.

2. The process as in claim 1, wherein step (a) comprises laying up uncured fiber-reinforced resin-composite pad strips on the base skin, and positioning the first and second tubular stiffeners on the pad strips.

3. The process as in claim 1, wherein step (a) comprises laminating a plurality of fiber-reinforced resin-composite sheets onto a surface of a forming tool to form the base skin.

4. The process as in claim 1, wherein step (a) comprising introducing an uncured filler material in spaces between the first and second overlapping layers and the first and second stiffeners.

5. The process as in claim 1, wherein the first and second tubular stiffeners are tubular pre-cured composite or tubular metal stiffeners.

6. The process as in claim 5, wherein the first and second tubular stiffeners have a trapezoidal cross-section.

* * * * *